US006490312B1

United States Patent
Pleschiutschnigg et al.

(10) Patent No.: US 6,490,312 B1
(45) Date of Patent: Dec. 3, 2002

(54) DIRECT-CURRENT ARC FURNACE COMPRISING A CENTRIC CHARGING SHAFT FOR PRODUCING STEEL AND A METHOD THEREFOR

(75) Inventors: Fritz-Peter Pleschiutschnigg, Duisburg (DE); Wei-Ping Wu, Erkrath (DE)

(73) Assignee: SMS Schloemann-Siemag Aktiengesellschaft, Düsseldorf (DE)

( * ) Notice: Subject to any disclaimer, the term of this patent is extended or adjusted under 35 U.S.C. 154(b) by 0 days.

(21) Appl. No.: 09/806,848

(22) PCT Filed: Sep. 22, 1999

(86) PCT No.: PCT/EP99/07046

§ 371 (c)(1),
(2), (4) Date: May 29, 2001

(87) PCT Pub. No.: WO00/20650

PCT Pub. Date: Apr. 13, 2000

(30) Foreign Application Priority Data

Oct. 7, 1998 (DE) .......................... 198 46 100

(51) Int. Cl.$^7$ .......................... H05B 7/22; H05B 7/144
(52) U.S. Cl. .......................... 373/66; 373/9; 373/108
(58) Field of Search .......................... 373/2, 8, 9, 60–62, 373/63, 64, 66, 71, 77, 79, 80, 81, 108; 75/10.61, 10.62, 10.63

(56) References Cited

U.S. PATENT DOCUMENTS

| | | | | |
|---|---|---|---|---|
| 1,034,788 A | * | 8/1912 | Greene | 373/80 |
| 1,338,103 A | * | 4/1920 | Shipton | 373/81 |
| 1,421,185 A | * | 6/1922 | Driscoll | 373/80 |
| 1,515,967 A | * | 11/1924 | Reagan | 373/81 |
| 1,987,952 A | * | 1/1935 | Wilson | 373/80 |
| 5,479,435 A | | 12/1995 | Yoshida et al. | 373/81 |
| 5,535,235 A | * | 7/1996 | Ao et al. | 373/78 |
| 6,269,112 B1 | * | 7/2001 | Poloni et al. | 373/78 |

FOREIGN PATENT DOCUMENTS

| | | |
|---|---|---|
| DE | 4232913 | 3/1995 |
| EP | 0663450 | 7/1995 |
| FR | 2627578 | 8/1989 |
| GB | 827205 | 2/1960 |
| WO | 9313228 | 7/1993 |

OTHER PUBLICATIONS

Patent Abstracts of Japan, vol. 013, No. 434 (M–875), Sep. 28, 1989 & JP 01 167573 A (Daido Steel Co Ltd), Jul. 3, 1989.
Hofmann W et al: "Contiarc—A New Scrap Melting Technology", vol. 224, Nr. 3, pp. 103, 105–106 XP000583748.

* cited by examiner

Primary Examiner—Tu Ba Hoang
(74) Attorney, Agent, or Firm—Friedrich Kueffner

(57) ABSTRACT

A direct-current arc furnace for producing steel has a smelting vessel with electrodes, tapping openings for the molten mass and slag, and a device for a direct removal of exhaust gases. The smelting vessel is extended upwardly by a central shaft for introducing melt-down material into the vessel. The extension of the central shaft forms a melt-down material column. A shaft suction device is provided as an extension of the shaft for removal of the exhaust gases during the smelting process. Adjacent to the shaft openings are provided in the upper part of the smelting vessel for receiving a vessel suction device for dust and/or gases resulting during the charging process of the melt-down material. The shaft suction device and the vessel suction device are connected to a common device and switching elements are provided for actuating only one suction device and/or adjusting a combination of the exhaust gas flows dependent on the charging and smelting process.

8 Claims, 2 Drawing Sheets

DIRECT-CURRENT ARC FURNACE COMPRISING A CENTRIC CHARGING SHAFT FOR PRODUCING STEEL AND A METHOD THEREFOR

BACKGROUND OF THE INVENTION

1. Field of the Invention

The invention relates to a direct-current arc furnace for producing steel, comprising a smelting vessel with at least two electrodes for producing arcs as well as tapping openings for the molten mass and the slag. It further concerns a method therefor.

2. Description of the Related Art

Several methods for producing steel are known. Essentially, two process routes are primarily in use: on the one hand, the steel production according to the conventional blast furnace-Bessemer converter route and, on the other hand, the production in an electric steel furnace.

An electric steel furnace is conventionally a flat-cylindrical or oval vessel for melting down scrap metal or directly reduced iron (sponge iron). In the case of electric arc furnaces, the furnace is usually filled with the lid being pivoted out of the way, and the batch is melted down with the arc of the electrodes which penetrate through the lid into the furnace. Emptying of the furnace is realized, depending on the type of furnace, via a tapping launder or an eccentric bottom tapping opening. Electric arc furnaces of the AC (alternating current) as well as DC (direct current) type are known.

Conventional direct-current arc furnaces have a graphite electrode and a bottom electrode. The resulting arc extends vertically downwardly onto the steel bath. Recently, direct-current arc furnaces with two graphite electrodes have also become known.

Conventional direct-current arc furnaces have the following disadvantages.

During the melting-down process an arc deflection results which causes an increased stress on the refractory material. In the shallow bath phase it is therefore required to provide a high foamed slag for covering the arc and for protecting the walls of the vessel.

During the charging process, the resulting exhaust gas or dust cannot be controlled. Also, it is impossible to control in the hot gases the iron oxidation of the scrap metal to be melted down.

Moreover, electrode breakage can result when the scrap metal drops.

Moreover, the temperatures of the exiting gases is too low so that they must be reheated in order to prevent dioxin formation. This requires additional burners in the exhaust gas system.

In direct-current arc furnaces with two electrodes, there is a great heat loading between the two electrodes in the furnace lid area.

SUMMARY OF THE INVENTION

The present invention has the object to propose a direct-current arc furnace and a method for producing steel wherein a reduced loading of the furnace and the environment will result despite an increase of productivity.

This object is solved according to the invention in regard to the furnace in that adjacent to the shaft openings are provided in the upper part of the smelting vessel for receiving suction devices for dust and/or gases which result during the charging process of the melt-down material, and in that the shaft suction device and the vessel suction device are connected to a common device and in that switching elements are provided for actuating only one suction device, respectively, and/or for adjusting a combination of the exhaust gas flows dependent on the charging and smelting process as well as in regard to the method in that during the charging the resulting gases and dust are removed by a furnace vessel suction device connected to openings in the upper part of the smelting vessel, wherein the exhaust gases are removed from the furnace vessel suction device and the shaft suction device into a common device.

The invention suggests that two electrodes and at least one bottom electrode are arranged in the furnace vessel such that two slanted arcs are generated which extend toward the center of the bottom of the smelting furnace and that the smelting vessel is extended in the upward direction by a centrally arranged shaft for introducing melt-down material into the vessel as well as for forming a column of melt-down material.

As a result of the features according to the invention it is achieved that two arcs will burn in a controlled fashion underneath the melt-down material column. With this directed arc deflection and the provided charging shaft, a controlled uniform feeding of the melt-down material into the furnace vessel and a high-capacity melting process are ensured. When using scrap metal, an improved scrap metal cutting and faster cutting are realizable.

With this solution a doubling of the previous capacity of a conventional graphite electrode of 140 kVA or 110 MW can be achieved, and a reduction of the diameter of the two electrodes and thus of the electrode consumption is possible.

It is conceivable, aside from the arrangement of two electrodes (cathodes) and a (common) bottom electrode (anode), to also arrange two cathodes and two anodes. The anodes are bottom electrodes and are arranged such at the center of the bottom that two arcs extending slantedly relative to the bottom center will result. Finally, it is also proposed to provide all embodiments with a larger number of electrodes wherein the feature of the slanted arc is always fulfilled.

It is also advantageous that as a result of the charging shaft the dropping of the scrap metal and thus electrode breakage can be prevented.

According to the invention, the electrodes are arranged such that the arcs no longer extend vertically but at a slant. Therefore, a reduced slag height for covering the arc is required.

For a simultaneous control of the exhaust gases it is proposed that, adjacent to the shaft, openings are provided in the upper part of the smelting vessel for receiving a suction device for dust and/or gases which are produced during the charging process of the melt-down material and that a suction device is provided as an extension of the shaft for sucking away the exhaust gases during the smelting process.

In this way, an exhaust gas control is possible already during the charging process. Simply by means of the removal action of the gases by means of the vessel suction device an iron oxidation of the melt-down material can be mostly avoided.

The directed exhaust gas control has at the same time the advantage that the suction removal of the exhaust gases through the shaft during the smelting process can be used for preheating the scrap metal. The scrap metal preheating is carried out only during the suction removal phase of the gases through the shaft. By doing so, the preheating time can be controlled and thus the iron oxidation of the melt-down material.

It is preferably suggested that the shaft suction device and the vessel suction device are designed such that they end in a common suction pipe and that means are provided for switching between the shaft suction device and the vessel suction device in order to change between the two suction devices and the two exhaust gas flows for the charging and smelting processes. The two suction devices are thus combined to a common device. As a result of the proposed switching elements, it is possible to actuate only one exhaust gas device or to adjust a combination of exhaust gas flows. A control of the exhaust gas flows as well as of the exhaust gas quantities can be realized. This advantageous embodiment of the exhaust gas devices represents a direct suction removal so that, in combination with the proposed shaft, the catching and thus removal of the flue gases resulting during charging and smelting and tapping are made possible.

By changing the exhaust gas flow direction within the shaft, it is also possible to realize an exhaust gas temperature control. With a controlled mixing of the two exhaust gas flows, a heating of the gases to temperatures above the dioxin formation can be achieved.

According to the invention, the smelting vessel in its upper part has openings for the vessel suction devices adjacent to the shaft and the openings for the electrodes. It is especially recommended to arrange the openings for the electrodes in relation to the shaft such that the shaft or the melt-down material column guided through the shaft serve as a thermal shield between the two electrodes or as a shield against too high heat energy for the upper vessel area.

A preferred embodiment of the direct-current arc furnace is comprised of a lower smelting vessel with an upper lid which is provided with the proposed openings.

In an even more concrete embodiment the direct-current arc furnace is provided with a vessel suction device which comprises two upwardly extending pipelines which open into a pipe for the shaft suction device, wherein pivotable flaps, for example, of heat-resistant steel, are provided in the transition area for affecting the respective exhaust gas quantity and exhaust gas flows.

The smelting vessel is provided furthermore with means for vertical introduction of the electrodes for the smelting process and removing the electrodes for the charging process.

Moreover, on the inner walls of the smelting vessel gas burners and oxygen burners are arranged by which the need for higher melting outputs can be achieved. Moreover, nozzles at the underside of the bath can be provided.

Overall, the proposed direct-current arc furnace has the advantage in comparison to those known in the art that for the charging process a pivoting of the lid is no longer required and a gas-tight furnace operation can be realized.

BRIEF DESCRIPTION OF THE DRAWINGS

Further details and advantages of the invention result from the claims and the following description. It is shown in:

DESCRIPTION OF PREFERRED EMBODIMENTS

Figure 1:
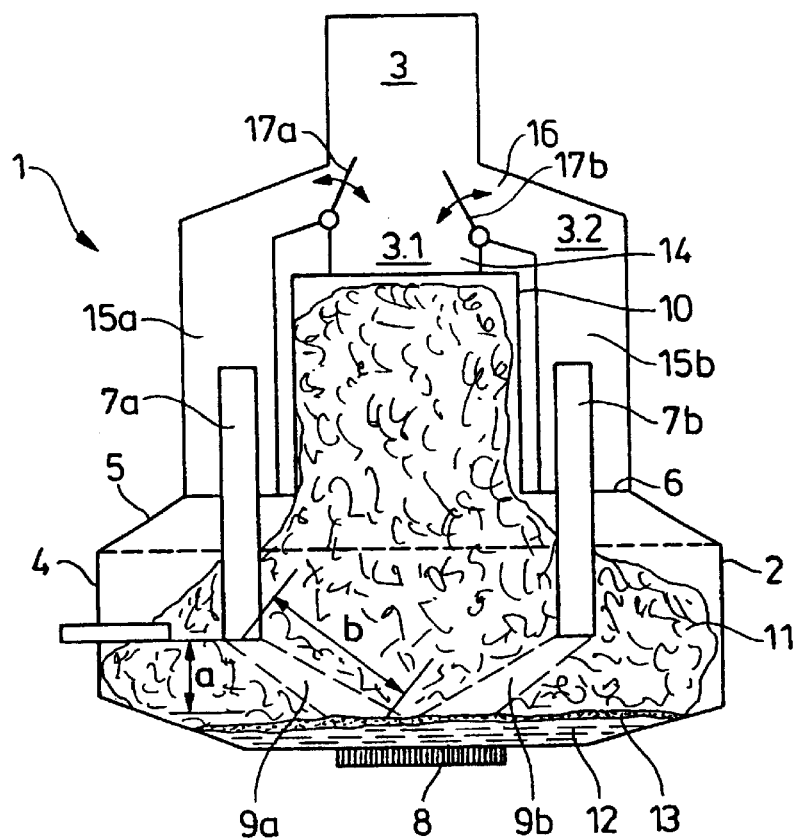
FIG. 1 a schematic side view of the furnace vessel with the exhaust gas device.

FIG. 1 shows a direct-current arc furnace 1 comprised of a furnace vessel 2 and an exhaust gas device 3. The furnace vessel 2 is comprised of a smelting area 4 and a lid 5. Via the openings 6 in+ the lid 5 two electrodes (cathodes) 7a,b are introduced into the vessel. On the bottom of the vessel between the two electrodes 7a, b a bottom electrode 8 is positioned. Two slantedly guided arcs 9a, b are the result. Their length, identified here with the letter b, is greater than the length of a vertically extending arc (length a) of known direct-current arc furnaces.

Above the furnace vessel 2 a shaft 10 is centrally arranged. Via this shaft 10, the furnace vessel 2 is filled with the melt-down material 11, in particular, scrap metal and sponge iron. The liquid steel resulting from the energy of the arcs 9a, b is identified with 12, while the slag is identified with 13.

As an extension to the shaft 10 a shaft suction device 3.1 is provided. The shaft suction device 3.1 is comprised of a tubular cylinder 14, means for suction removal, as well as a filter device (not shown). The tubular cylinder 14 is connected laterally with two guide pipes 15a, b which form the vessel suction device 3.2. At the interfaces 16 between the two devices 3.1, 3.2 movable switching elements in the form of flaps 17a, b are provided. They prevent in one position the exhaust gas flow through the guide pipes 15a, b of the vessel suction device 3.2, and, by movement of the flaps 17a, b into the other extreme position, the suction device 3.1 can be closed off above the shaft 10. The adjustment of intermediate positions is possible.

Figure 2:
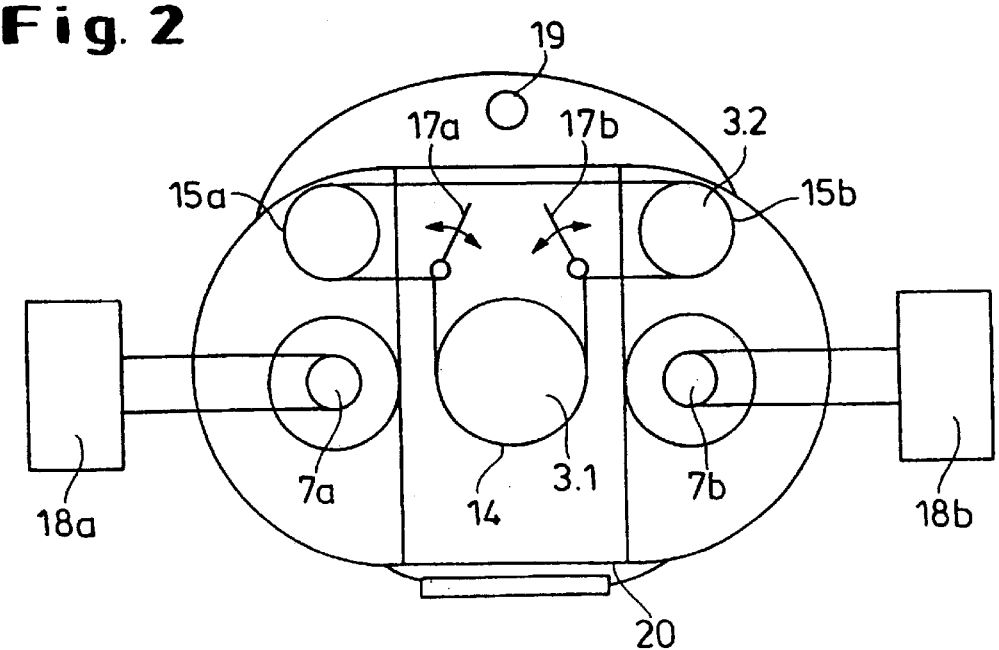
FIG. 2 a schematic plan view onto the furnace vessel with the exhaust gas device.

The plan view according to FIG. 2 illustrates the proposed arrangement of the shaft 10 with shaft suction pipe 14, with electrodes 7a, b arranged adjacent to the shaft 10 with means for moving the electrodes 18a, b as well as the guide pipes 15a, b of the vessel suction device 3.1. The tapping launder 19 for the liquid steel as well as the slag door 20 are schematically shown.

Figure 3:
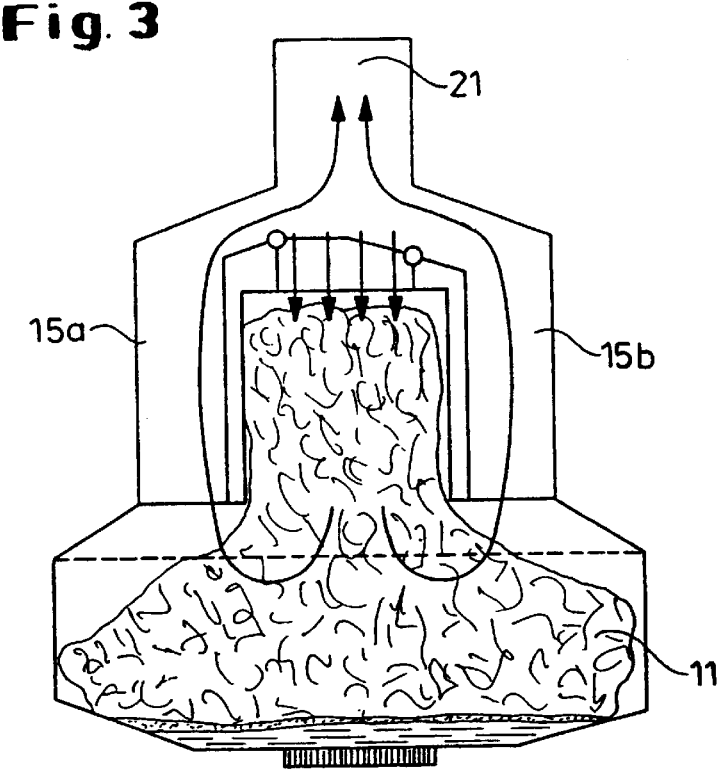
FIG. 3 a schematic side view of the furnace vessel with the exhaust gas flow during the charging processes.

By means of the proposed gas suction devices 3.1 and 3.2 it is possible to control the exhaust gas flows. FIG. 3 shows the flow orientation (course of the arrow) of exhaust gases and dust during charging of the melt-down material 11, wherein the exhaust gases and the dust are removed via the guide pipes 15a, b of the vessel suction device 3.2 into a common pipe 21. Downstream thereof filter devices (not shown) and recovery devices are provided in a conventional way.

Figure 4:
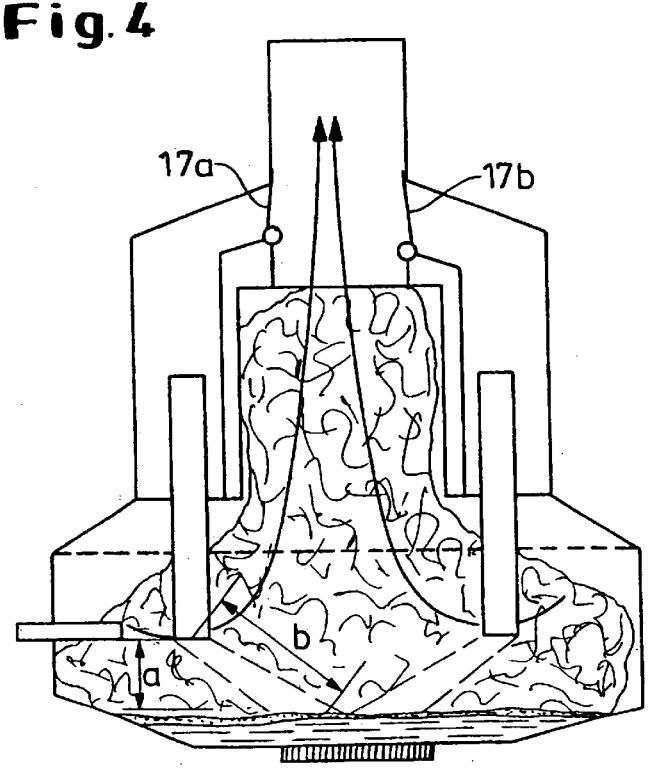
FIG. 4 a schematic side view of the furnace vessel with the exhaust gas flow during the smelting process.

During the smelting process (FIG. 4) the flaps 17a, b are arranged such that the guide pipes 15a, b of the vessel suction device 3.2 are closed. The gases resulting during smelting, primarily combustion oxides, flow out through the shaft 10 and thus through the scrap metal column (see course of arrow in FIG. 4).

What is claimed is:
1. A direct-current arc furnace for producing steel, comprising:
   a smelting vessel having electrodes for producing arcs, tapping openings for a molten mass and slag, and means for a direct removal of exhaust gases, wherein at least two of the electrodes are introduced from above into the smelting vessel and at least one of the electrodes is arranged at a bottom of the smelting vessel such that two slantedly extending arcs oriented toward a center of the bottom of the smelting furnace results;
   a central shaft, connected to the smelting vessel an extending the smelting vessel upwardly, for introducing melt-down material into the smelting vessel, wherein the central shaft is provided for forming a melt-down material column;

a shaft suction device provided as an extension of the central shaft for removal of the exhaust gases during a smelting process;

wherein the smelting vessel has an upper part and first openings provided in the upper part adjacent to the central shaft;

a vessel suction device received in the first openings for removing dust and gases resulting during a charging process of melt-down material;

wherein the shaft suction device and the vessel suction device are connected to a common device;

switching elements for actuating one or more of the shaft and vessel suction devices for removing the hot exhaust gases produced during melting and the gases and dust resulting during charging separately or together dependent on the charging and smelting processes.

2. The direct-current arc furnace according to claim 1, wherein the common device is a common suction pipe and wherein the switching elements are provided between the shaft suction device and the vessel suction device in order to switch between the vessel and the shaft suction devices during the charging and smelting processes.

3. The direct-current arc furnace according to claim 2, wherein the upper part of the smelting vessel has second openings for the at least two electrodes that are introduced from above, wherein the at least two electrodes that are introduced from above are positioned relative to the shaft such that the shaft, respectively, the melt-down material column guided through the shaft serves as a thermal shielding between the at least two electrodes that are introduced from above.

4. The direct-current arc furnace according to claim 3, wherein the smelting vessel is comprised of a lower smelting area and an upper lid forming the upper part with the first and second openings.

5. The direct-current arc furnace according to claim 2, wherein the vessel suction device comprises two upwardly extending guide pipes which open in a transition area into the shaft suction device in the form of a pipe, further comprising pivotable flaps arranged in the transition area and configured to control a quantity and a flow of the exhaust gases of the smelting process and of the dust and gases of the charging process.

6. The direct-current arc furnace according to claim 3, comprising means for vertically introducing the at least two electrodes that are introduced from above into the smelting vessel for the smelting process and for removing the at least two electrodes that are introduced from above for the charging process.

7. The direct-current arc furnace according to claim 1, wherein the melt-down material (11) is scrap metal and directly reduced iron.

8. A method for producing steel in a direct-current arc furnace, the method comprising the steps of:

charging a smelting vessel from above with a melt-down material and melting the batch down by arcs generated between electrodes, wherein charging of the furnace vessel with the melt-down material is carried out through a central shaft arranged centrally above the smelting vessel and wherein melting is realized such that the primary melting output of the electrodes is realized in the area below the central shaft close to a bottom of the smelting vessel;

removing hot exhaust gases produced during melting by a shaft suction device arranged above the central shaft and simultaneously pre-heating the melt-down material in the shaft by the hot exhaust gases;

removing gases and dust resulting during charging by a vessel suction device connected to openings in an upper part of the smelting vessel;

removing the hot exhaust gases produced during melting and the gases and dust resulting during charging into a common device; and actuating by switching elements one or more of the shaft and vessel suction devices for removing the hot exhaust gases produced during melting and the gases and dust resulting during charging separately or together dependent on the charging and smelting processes.

* * * * *